(12) United States Patent
Stucker et al.

(10) Patent No.: US 11,303,464 B2
(45) Date of Patent: Apr. 12, 2022

(54) ASSOCIATING CONTENT ITEMS WITH IMAGES CAPTURED OF MEETING CONTENT

(71) Applicant: Microsoft Technology Licensing, LLC, Redmond, WA (US)

(72) Inventors: Brian Scott Stucker, Redmond, WA (US); Austin Seungmin Lee, Seattle, WA (US); Alice Shirong Ferng, Bellevue, WA (US); Eddie Louis Mays, III, Maple Valley, WA (US); Rachel Fox Romano, Redmond, WA (US); Lauren Diana Lo, Seattle, WA (US); Hauke Antony Gentzkow, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 199 days.

(21) Appl. No.: 16/704,771

(22) Filed: Dec. 5, 2019

(65) Prior Publication Data

US 2021/0176081 A1 Jun. 10, 2021

(51) Int. Cl.
*H04L 12/18* (2006.01)
*G06F 16/903* (2019.01)
(Continued)

(52) U.S. Cl.
CPC .... *H04L 12/1831* (2013.01); *G06F 16/90335* (2019.01); *G06K 9/00664* (2013.01);
(Continued)

(58) Field of Classification Search
None
See application file for complete search history.

(56) References Cited

U.S. PATENT DOCUMENTS

| 7,403,225 B2 | 7/2008 | Singh |
| 2007/0041666 A1 | 2/2007 | Nagamine et al. |

(Continued)

FOREIGN PATENT DOCUMENTS

| CA | 2653838 C | 7/2016 |
| CN | 108847241 A * | 11/2018 |

(Continued)

OTHER PUBLICATIONS

"International Search Report and Written Opinion Issued in PCT Application No. PCT/US20/059248", dated Feb. 4, 2021, 11 Pages.

(Continued)

*Primary Examiner* — Mohammed Rachedine

(57) ABSTRACT

Systems, methods, and software are disclosed herein for associating images with content items. In an implementation, a computing device determines that an image captured of a scene includes a display of meeting content. The device identifies a content item comprising a source of the meeting content in the scene and may then create an association between an instance of the image and an instance of the content item. The device may, for example, create a link to the content item that can be embedded in or otherwise associated with the image file. The reverse may also be accomplished, whereby a link to the image may be created and embedded in or otherwise associated with the content item.

20 Claims, 6 Drawing Sheets

(51) Int. Cl.
  *G06F 3/0482* (2013.01)
  *G06K 9/00* (2006.01)
  *G06K 9/62* (2006.01)
  *G06Q 10/10* (2012.01)

(52) U.S. Cl.
  CPC ....... *G06K 9/6262* (2013.01); *G06Q 10/1095* (2013.01); *G06F 3/0482* (2013.01)

(56) References Cited

U.S. PATENT DOCUMENTS

| | | |
|---|---|---|
| 2011/0072015 A1 | 3/2011 | Lin et al. |
| 2013/0286199 A1* | 10/2013 | Di Censo ........... H04N 1/00129 348/143 |
| 2015/0294220 A1* | 10/2015 | Oreif ........................ G06N 5/04 706/12 |
| 2018/0373724 A1 | 12/2018 | Novak et al. |
| 2019/0266573 A1* | 8/2019 | Radhakrishnan .. G06Q 10/1095 |
| 2019/0295302 A1* | 9/2019 | Fu ........................ G06T 7/0002 |
| 2020/0092519 A1* | 3/2020 | Shin ........................ G06N 3/006 |
| 2020/0098282 A1* | 3/2020 | Chen ........................ G09B 7/00 |

FOREIGN PATENT DOCUMENTS

| | | | |
|---|---|---|---|
| CN | 108847241 A | * 11/2018 | |
| CN | 108920488 A | * 11/2018 | ............. G06F 16/33 |
| CN | 109817245 A | * 5/2019 | |
| CN | 110473566 A | * 11/2019 | |
| WO | 2015073762 A1 | 5/2015 | |

OTHER PUBLICATIONS

Ahern, et al., "ZoneTag: Designing Context-Aware Mobile Media Capture to Increase Participation", In Proceedings of Pervasive Image Capture and Sharing, Sep. 2006, 3 Pages.

Erol, et al., "Linking Multimedia Presentations with their Symbolic Source Documents: Algorithm and Applications", In Proceedings of Eleventh ACM International Conference on Multimedia, Nov. 2, 2003, pp. 498-507.

Erol, et al., "Retrieval of Presentation Recordings with Digital Camera Images", In Proceedings of IEEE Conference on Computer Vision and Pattern, Jun. 2014, 2 Pages.

Sarvas, et al., "Metadata Creation System for Mobile Images", In Proceedings of 2nd International Conference on Mobile Systems, Applications, and Services, Jun. 6, 2004, pp. 36-48.

* cited by examiner

US 11,303,464 B2

ASSOCIATING CONTENT ITEMS WITH IMAGES CAPTURED OF MEETING CONTENT

TECHNICAL FIELD

Aspects of the disclosure are related to the fields of computing devices and software applications, and in particular, to enhancing the content capture experience in meetings.

TECHNICAL BACKGROUND

A variety of content capture technologies allow users to capture meeting content for later reference and understanding. Some solutions are built-in to a given meeting environment such as the ability to record the audio and/or video exchanged during an online conference, as well as the screen sharing of the various participants. Other capture modalities may be employed in a more ad-hoc fashion, such as when users snap photographs of white board content.

Along the same lines, meeting participants often take photographs of the digital content being displayed in the context of a meeting. A user may, for example, take a picture or capture a screen shot of a slide from a slide deck being presented on a display screen to meeting participant(s). The resulting image is then persisted in accordance with one of many suitable file formats (e.g. JPEG, BMP, and GIF) and can be viewed, shared, and the like.

Overview

Computing devices are software are disclosed herein that enhance the content capture experience by linking the content item(s) being presented to the images taken of them by users. Such an advance improves the ability of users to find and consume the content items that underly the presentation of content in a meeting.

In one or more implementations, a computing device determines that an image captured of a scene includes a display of meeting content. The device identifies a content item comprising a source of the meeting content in the scene and may then create an association between an instance of the image and an instance of the content item. The device may, for example, create a link to the content item that can be embedded in or otherwise associated with the image file. The reverse may also be accomplished, whereby a link to the image may be created and embedded in or otherwise associated with the content item.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several implementations are described in connection with these drawings, the disclosure is not limited to the implementations disclosed herein. On the contrary, the intent is to cover all alternatives, modifications, and equivalents.

DETAILED DESCRIPTION

Figure 1:
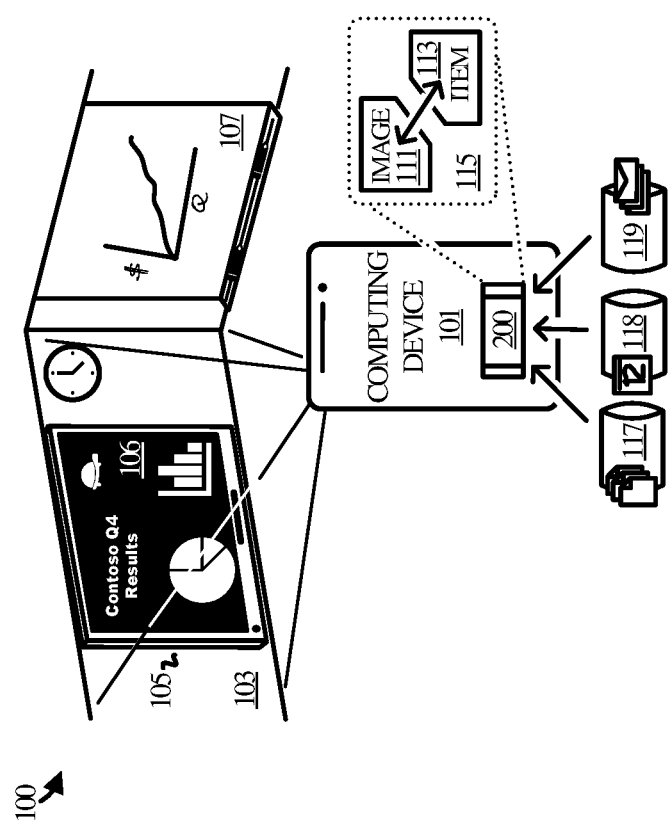
FIG. 1 illustrates an operational scenario in an implementation.

Aspects of the present disclosure relate to computing technology that enhances the user experience with respect to content capture and retrieval. In various implementations, a computing device captures an image of a scene and determines whether the image includes a display of meeting content. For example, a user in a meeting may take a photo of a slide being presented on a monitor in a conference room and the device may recognize that the scene includes content. The device may then identify a content item that comprises a source of the meeting content in the scene such that an association can be created between the image and the content item, thereby improving the accessibility of the content item.

In some implementations, creating the association between the image and the content item may include embedding a link to the content item in the image. Determining that the image of the scene include a display of meeting content may be accomplished by applying a content recognition algorithm to at least a portion of the image. The content recognition algorithm may include a machine learning model configured based on training data representative of other images classified as comprising displays of other meeting content.

In the same or other implementations of the system, identifying the content item may include searching a data repository for the content item based on search criteria associated with the image. The content item may include a file formatted in accordance with a presentation format, a word processing document format, or a spreadsheet workbook format. In some cases, the meeting content may include a visual rendering of the file. The data repository may include cloud storage and, to search the data repository, the program instructions direct the one or more processors to make a remote call to the cloud storage with the search criteria.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the claims.

Figure 2:
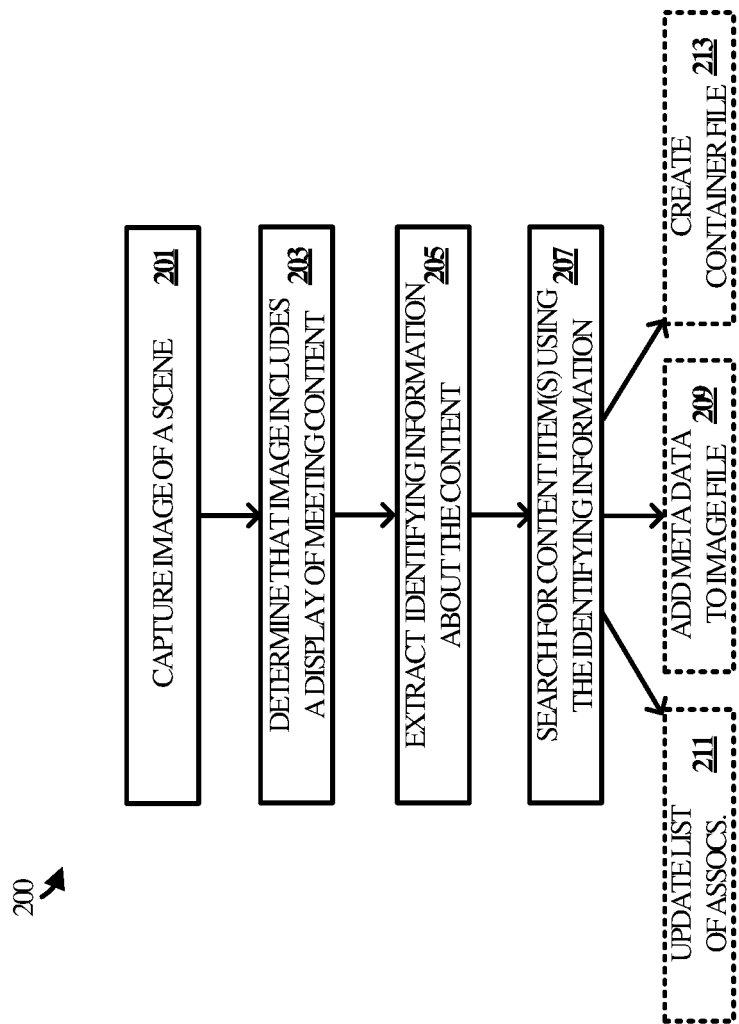
FIG. 2 illustrates a content association process in an implementation.
Figure 6:
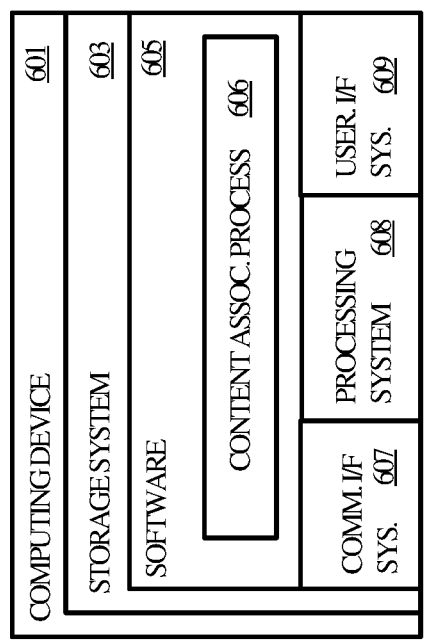
FIG. 6 illustrates a computing system suitable for implementing the various operational environments, user experiences, architectures, processes, scenarios, and sequences discussed below with respect to the Figures.

Referring now to the drawings, FIG. 1 illustrates operational environment 100 and computing device 101 in an implementation. Examples of computing device 101 include—but are not limited to—mobile phones, tablet computers, laptop computers, desktop computers, wearable devices (e.g. watches and glasses), of which computing device 601 in FIG. 6 is representative. Computing device 101 employs content association process 200, which may be implemented in hardware, software, firmware, or any combination thereof. Computing device 101, when executing content association process 200, operates as follows, referring parenthetically to the steps in FIG. 2.

In operation, computing device 101 captures, receives, or otherwise obtains an image 111 of a scene (step 201). The scene includes a display device 105 affixed to a wall 103, for example in a conference room. The wall also includes a white board 107, which is not captured in the image. Computing device 101 captures the image using its integrated camera. Alternatively, an external camera connected to computing device 101 could capture the image, as could a remote camera. In both cases, computing device 101 could be understood to have captured the image by way of receiving the images captured by the external and remote cameras.

Computing device 101, having captured, received, or otherwise obtained image 111, determines that the image of the scene includes a display of meeting content (step 203). Examples of content include electronic slide presentations (e.g. slide decks), word processing documents, spreadsheet workbooks, text messages, chatroom messages, blog posts, micro blog posts, social network posts, or any other digital content that can be displayed. The content may be displayed on a conference room monitor, a computer monitor, or a phone screen, projected onto a display surface, or rendered visually in any other suitable manner. Display device 105 in this scenario displays a slide 106 from a slide presentation.

Computing device 101 may determine that the image of the scene includes meeting content in a variety of ways. For example, computing device 101 (or a remote service) may employ a content recognition algorithm to determine that content is displayed in the scene. In other examples, computing device 101 may be instructed or informed by user input that the scene includes a display of content. In other examples, an explicit determination that the scene includes content may be avoided. Rather, computing device 101 can determine implicitly that the scene includes content, or its presence may be presumed.

Next, computing device 101 extracts identifying information about the content (step 205). The information may be extracted from one or more of: the image itself, the context of the image, and user input. For example, computing device 101 may extract text from the image using a character recognition algorithm. The date, time, and/or location may be extracted from image file meta data or from other aspects of the operational environment. With respect to user input, spoken utterances may be transcribed and parsed for identifying information. Computing device 101 may extract the identifying information using local resources, remote resources, or a combination of local and remote resources.

Using the identifying information, computing device 101 proceeds to search for a content item that comprises a source of the content displayed in the scene (step 207). This may be accomplished by searching one or more of data stores 117, 118, and 119 using identifying information associated with a given content item. Non-limiting examples of identifying information include text and/or objects extracted from the image of the content item, event information associated with one or more scheduled events that overlap with a time and date of the image capture, and information extracted from transcriptions of spoken utterances. Non-limiting examples of data stores include email mailboxes, digital calendars, document repositories, cloud storage, message repositories, chat messages, micro blogs, collaboration sites, social networks, and the like.

Having identified one or more content items, computing device 101 proceeds to associate an instance of the image of the scene with the one or more content items (step 209). This may be accomplished in a variety of ways such as: adding meta data to an image file (step 209A), updating a list of associations (step 209B), or creating a container file (step 209C). For example, a link to a given content item may be embedded in the image (or a copy of the image) such that a user can navigate to the content item by touching, clicking on, or otherwise selecting the embedded link. Meta data for the embedded link may be stored in the image file itself or could be maintained separately from the image data used to render the image. In another example, a list or other such separate data structure may be maintained that includes meta data that details the associations between content items and images. In a container scenario, a single data structure (e.g. a container file) may be created that holds both the image file and the one or more associated content items.

Various technical effects result from the association 115 of the image 111 with a content item 113. The association 115 allows a user to easily open and consume a content item from the location of an image, reducing the number of steps that would otherwise be performed to search for, navigate to, and open the content item. In a similar way, the association 115 of the image 111 with the content item 133 may allow a user to more easily open and consume the image 111 from the location of the content item. The reduction in steps may in some (but not all) circumstances reduce power consumption, improve battery life, and otherwise improve the performance of a given device. In any case, such an advance improves the user experience when creating, capturing, and managing content.

Figure 3:
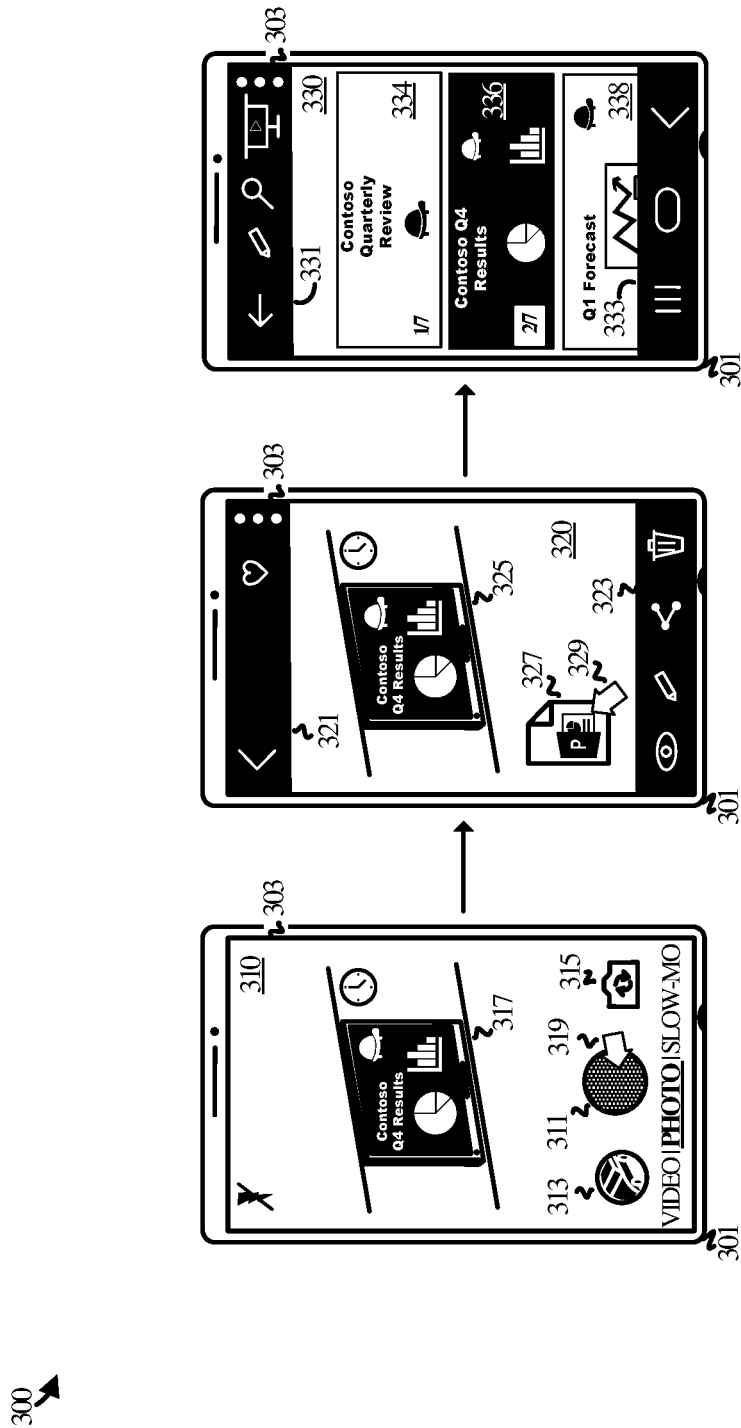
FIG. 3 illustrates a user experience in an implementation.

FIG. 3 illustrates a user experience 300 with respect to computing device 301 in an implementation. Examples of computing device 301 include—but are not limited to—mobile phones, tablet computers, laptop computers, desktop computers, and wearable devices (e.g. watches and glasses), of which computing device 601 in FIG. 6 is representative. Computing device 301 includes a display 303 capable of displaying user interfaces and receiving user input. Computing device 301 may include other elements such as a microphone assembly, a speaker assembly, a camera assembly, and the like.

User experience 300 begins with a user interface 310 surfaced on display 303. User interface 310 includes various controls for interacting with a camera application. The controls include a capture button 311, a gallery button 313, and an orientation button 315. User interface 310 also includes various options for changing modalities (e.g. video, photo, and slow-motion). The capture button 311 may be pressed to capture an image of a scene viewed through a camera assembly of computing device 301, while the gallery button 313 provides a mechanism for navigating to a gallery view of images stored on the device. Orientation button 315 allows the user to change which camera sub-assembly (front or back) is used to take a photo.

User interface 310 in this example also includes a live image 317 of a scene as captured via the camera assembly (and front-facing sub-assembly) of computing device 301. The live image may be persisted as a captured image upon user input 319 comprising a selection of capture button 311. The captured version of the image may then be viewed by navigating to the image directly, via an image gallery, or in some other manner. In so doing, display 303 transitions from user interface 310 to user interface 320.

User interface 320 includes various controls for interacting the captured image 325 displayed within a function menu 321 and a function menu 323. Function menu 321 includes a button for navigating back to a gallery, a button for liking an image, and a button for navigating to a sub-menu. Function menu 323 includes an image recognition button, an edit button, a sharing button, and a trash button.

Either during or after the image is captured, computing device 301 employs a process the same as or similar to content association process 200 to identify and associate content with the image. A link to the content may be embedded in the image such that an instance of the link may be surfaced in user interface 320. Icon 327 in user interface 320 is one example of an instance of a link that may be displayed in association with captured image 325.

Icon 327 links to a slide presentation determined by computing device 301 to be associated with captured image 325. Like the example provided with respect to FIG. 1, the captured image 325 in user experience 300 comprises slide content displayed on a display device. This fact is recognized by the content association process employed by computing device 301. The related slide presentation is identified accordingly and the link to it displayed in an overlaid manner in user interface 320. Icon 327 includes an active link to the slide presentation such that user input 329 comprising a selection of the icon results in computing device 301 launching a presentation application and opening the slide presentation in user interface 330.

User interface 330 is exemplary of an application environment in which a slide presentation, word processing document, spreadsheet, or other such content may be opened. User interface 330 in this example includes various controls in function menu 331 and function menu 333 for interacting with a slide presentation. Function menu 331 includes a back button, an edit button, a search button, and a play button. Function menu 333 includes controls for navigating away from the presentation application to other aspects of the local environment.

User interface 330 also includes preview versions of the various slides in the slide presentation represented by slide 334, slide 336, and slide 338. Touching or otherwise selecting the play button in function menu 331 would cause the slides to be displayed in a full-screen mode, one slide at a time. It may be appreciated that slide 336 corresponds to the content displayed by the display screen in the captured image 325 of the scene. Thus, a user is able to easily navigate to the slide presentation directly from the view of the captured image 325, rather than having to navigate elsewhere to search for the presentation and/or to open it.

Figure 4:
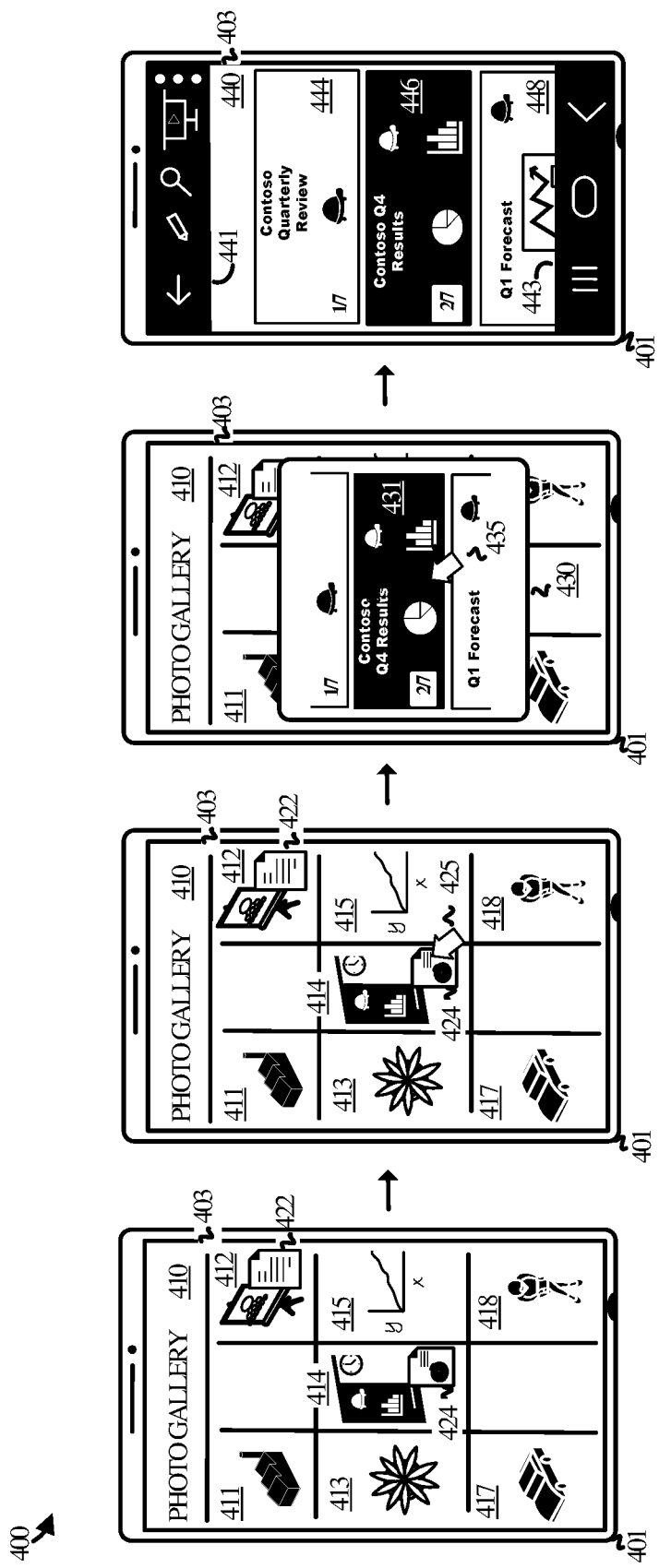
FIG. 4 illustrates a user experience in an implementation.

FIG. 4 illustrates another user experience 400 in an implementation. User experience 400 involves computing device 401, of which computing device 601 is representative. Examples include—but are not limited to—mobile phones, tablet computers, laptop computers, desktop computers, and wearable devices (e.g. watches and glasses). Computing device 301 includes a display 303 capable of displaying user interfaces and receiving user input. Computing device 301 may include other elements such as a microphone assembly, a speaker assembly, a camera assembly, and the like.

User experience 400 includes a user interface 410 to a photo gallery surfaced by display 403. The user interface 410 includes a grid of image previews 411-418, some of which include links to content items associated with the images. Image preview 411, for example, does not include a link, whereas image preview 412 includes a file icon 422 that links to a corresponding content item (e.g. a word processing document). The content item would have been determined to relate to content captured in the image previewed by image preview 412, whereas the image behind image preview 411 would have been determined to lack content associated with a content item. Similarly, image preview 413 lacks an embedded icon, while image preview 414 includes a file icon 424 linked to a slide presentation. Slide previews 415, 417, and 418 also lack any such links.

In operation, a user supplies user input 425 comprising a selection of file icon 424. Selecting file icon 424, which links to a slide presentation, causes computing device 401 to surface a preview 430 of the slide presentation in user interface 410. The preview shows portions of the slides in the slide presentation, including slide 431. Slide 431 is notable for being the source of the content captured in the image behind image preview 414.

User input 435 comprising a selection preview 430 causes computing device 401 to open the complete slide presentation associated with the preview. The slide presentation is opened in a user interface 440 to a presentation application. User interface 440 includes various controls in function menu 441 and function menu 443 for interacting with a slide presentation such as a back button, an edit button, a search button, and a play button in function menu 441, and controls for navigating away from the presentation application to other aspects of the local environment in function menu 443.

User interface 440 also includes preview or minimized versions of the various slides in the slide presentation represented by slide 444, slide 446, and slide 448. Touching or otherwise selecting the play button in function menu 441 would cause the slides to be displayed in a full-screen mode, one slide at a time. It may be appreciated that slide 446 corresponds to the content captured in the image behind image preview 414. It may be appreciated from user experience 400 that a user is able to easily navigate to the slide presentation rather than having to navigate elsewhere to search for the presentation and/or to open it. In addition, a user is able to navigate to the slide presentation from a gallery preview of a captured image, mitigating the need to have to open the image before interacting with a file icon linked to the presentation.

Figure 5:
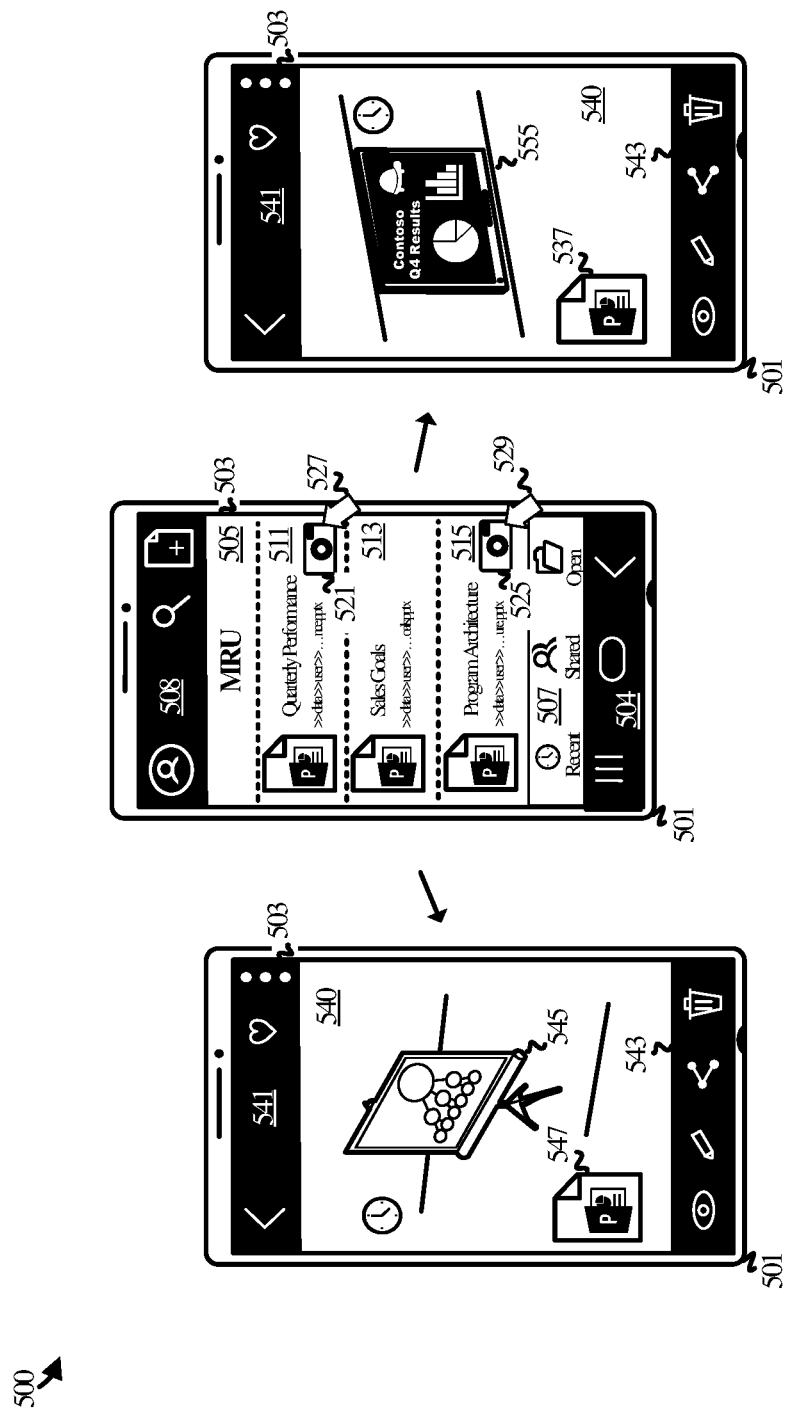
FIG. 5 illustrates a user experience in an implementation.

User experience 500 in FIG. 5 illustrates a scenario whereby content items include links to images, as opposed to images having links to content items. In operation, computing device 501 includes a user interface 505 to a most recently used (MRU) list of content items. The MRU list includes presentation graphic 511, presentation graphic 513, and presentation graphic 515. Each presentation graphic can be touched, clicked on, or otherwise selected to open its underlying slide presentation. User interface 505 also includes a function menu 508 for searching for and opening new presentations, as well as function menu 504 for navigating to other aspects of the computing environment.

In addition, presentation graphics 511 and 515 include photo icons 521 and 525 respectively that link to images associated with the content items. User input 527 comprising a selection of photo icon 521 causes computing device 501 to open its corresponding image in a user interface 540 to an image viewer. User interface 540 includes a function menu 541 with options for interacting with the image, as well as a function menu 542 with options for navigating to other aspects of the local computing environment. It may be appreciated that the image in user interface 540 captures a display 545 of content which, in this example, is a slide from a slide presentation displayed on a screen.

User interface 540 also includes a file icon 547 that links to the slide presentation comprising the source of the slide displayed on the screen. That is, computing device 501 (or some other device) previously determined that the image includes a depiction of a display of content and that a slide presentation was the source of the content. Accordingly, file icon 547 corresponds to the slide presentation and a selection of file icon 547 would cause computing device 501 to open the slide presentation in the context of a suitable application.

Continuing with user experience 500, user input 529 comprises a selection of photo icon 525, which causes computing device 501 to open a corresponding image file in user interface 540. It may be appreciated that the image in user interface 540 captures a display 555 of content which, in this example, is a slide from a slide presentation displayed on a monitor.

In this instance, user interface 540 includes a file icon 547 that links to the slide presentation comprising the source of the slide displayed on the screen. That is, computing device 501 (or some other device) previously determined that the image includes a depiction of a display of content and that a slide presentation was the source of the content. Accordingly, file icon 557 corresponds to the slide presentation and a selection of file icon 557 would cause computing device 501 to open the slide presentation in the context of a suitable application.

FIG. 6 illustrates computing device 601 that is representative of any device or collection of devices in which the various processes, programs, services, and scenarios disclosed herein may be implemented. Examples of computing device 601 include, but are not limited to, mobile phones, tablets, laptops, desktops, watches and other wearable devices, and Internet of Things (IoT) devices. Some or all aspects of the various processes, programs, services, and scenarios disclosed herein may also be implemented on server computers, cloud computing platforms, and data center equipment, as well as any other type of physical or virtual server machine, container, and any variation or combination thereof.

Computing device 601 may be implemented as a single apparatus, system, or device or may be implemented in a distributed manner as multiple apparatuses, systems, or devices. Computing device 601 includes, but is not limited to, processing system 608, storage system 603, software 605, communication interface system 607, and user interface system 609. Processing system 608 is operatively coupled with storage system 603, communication interface system 607, and user interface system 609.

Processing system 608 loads and executes software 605 from storage system 603. Software 605 includes and implements content association process 606, which is representative of the content association processes discussed with respect to the preceding Figures. When executed by processing system 608 to enhance the user experience with respect to content capture experiences, software 605 directs processing system 608 to operate as described herein for at least the various processes, operational scenarios, and sequences discussed in the foregoing implementations. Computing device 601 may optionally include additional devices, features, or functionality not discussed for purposes of brevity.

Referring still to FIG. 6, processing system 608 may comprise a micro-processor and other circuitry that retrieves and executes software 605 from storage system 603. Processing system 608 may be implemented within a single processing device but may also be distributed across multiple processing devices or sub-systems that cooperate in executing program instructions. Examples of processing system 608 include general purpose central processing units, graphical processing units, application specific processors, and logic devices, as well as any other type of processing device, combinations, or variations thereof.

Storage system 603 may comprise any computer readable storage media readable by processing system 608 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 608 or possibly other systems.

Software 605 (including content association process 606) may be implemented in program instructions and among other functions may, when executed by processing system 608, direct processing system 608 to operate as described with respect to the various operational scenarios, sequences, and processes illustrated herein. For example, software 605 may include program instructions for implementing a content association process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 608.

In general, software 605 may, when loaded into processing system 608 and executed, transform a suitable apparatus, system, or device (of which computing device 601 is representative) overall from a general-purpose computing system into a special-purpose computing system customized to provide enhanced content capture capabilities. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

User interface system 609 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, a conversational user interface, or any other type of user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable media that, when executed by the one or more processors, direct the computing apparatus to at least:
   determine, via a machine learning model configured based on training data comprising other images classified as including displays of other meeting content, that an image captured of a scene includes a display of meeting content; and
   subsequent to identifying a content item comprising a source of the meeting content in the scene, create an association between an instance of the image and the content item.

2. The computing apparatus of claim 1 wherein, to create the association between the image and the content item, the program instructions direct the computing apparatus to embed a link to the content item in the image.

3. The computing apparatus of claim 1 wherein the program instructions further direct the computing apparatus to surface, in a graphical user interface (GUI), an instance of the association.

4. The computing apparatus of claim 3 wherein the program instructions further direct the computing apparatus to, in response to a selection of the instance of the association, launch an application and open the meeting content in a GUI of the application.

5. The computing apparatus of claim 1 wherein, to identify the content item comprising the source of the meeting content, the program instructions direct the computing apparatus to search a data repository for the content item based on search criteria associated with the image.

6. The computing apparatus of claim 5 wherein:
   the content item comprises a file formatted in accordance with a presentation format, a word processing document format, or a spreadsheet workbook format; and
   the meeting content comprises a visual rendering of the file.

7. The computing apparatus of claim 6 wherein the data repository comprises cloud storage and wherein, to search the data repository, the program instructions direct the computing apparatus to make a remote call to the cloud storage with the search criteria.

8. The computing apparatus of claim 6 wherein:
the search criteria comprise a date and time of the image;
the data repository comprises an event calendar; and
the file comprises an attachment to an event in the event calendar.

9. The computing apparatus of claim 6 wherein:
the search criteria comprise a date and time of the image;
the data repository comprises an email mailbox; and
the file comprises an attachment to an email in the email mailbox.

10. The computing apparatus of claim 6 wherein:
the search criteria comprise information extracted from the image;
the data repository comprises a file store; and
the file comprises one of multiple files stored in the file store.

11. A method of operating a computing device, the method comprising:
capturing an image of a scene;
determining, via a machine learning model configured based on training data comprising other images classified as including displays of other meeting content, that the image includes a display of meeting content; and
subsequent to identifying a content item comprising a source of the meeting content, creating an association between an instance of the image and the content item.

12. The method of claim 11 wherein, creating the association between the image and the content item comprises embedding a link to the content item in the image.

13. The method of claim 11 further comprising surfacing, in a graphical user interface (GUI), an instance of the association.

14. The method of claim 13 further comprising, in response to a selection of the instance of the association, launching an application and open the meeting content in a GUI of the application.

15. The method of claim 13 wherein identifying the content item comprises searching a data repository for the content item based on search criteria associated with the image.

16. The method of claim 15 wherein:
the content item comprises a file formatted in accordance with a presentation format, a word processing document format, or a spreadsheet workbook format; and
the meeting content comprises a visual rendering of the file.

17. The method of claim 16 wherein the data repository comprises cloud storage and wherein searching the data repository comprises making a remote call to the cloud storage with the search criteria.

18. The method of claim 16 wherein the search criteria comprise a date and time of the image, the data repository comprises an event calendar, and the file comprises an attachment to an event in the event calendar.

19. The method of claim 16 wherein the search criteria comprise a date and time of the image, the data repository comprises an email mailbox, and the file comprises an attachment to an email in the email mailbox.

20. The method of claim 16 wherein the search criteria comprise information extracted from the image, the data repository comprises a file store, and the file comprises one of multiple files stored in the file store.

* * * * *